United States Patent [19]

Fredrikson

[11] 4,082,544
[45] Apr. 4, 1978

[54] ELECTRIC INDUCTION HEATING OF MATERIALS OF LOW ELECTRICAL CONDUCTIVITY

[75] Inventor: Bengt Fredrikson, Vasteras, Sweden

[73] Assignee: ASEA Aktiebolag, Vasteras, Sweden

[21] Appl. No.: 659,285

[22] Filed: Feb. 19, 1976

[30] Foreign Application Priority Data

Feb. 25, 1975 Sweden .................................. 7502083

[51] Int. Cl.² .................................................. C21C 5/52
[52] U.S. Cl. .............................................. 75/12; 75/11; 75/59
[58] Field of Search ..................................... 75/10–12, 75/59, 60

[56] References Cited

U.S. PATENT DOCUMENTS 3,827,877  8/1974  Pantke ........................................ 75/11

Primary Examiner—Peter D. Rosenberg
Attorney, Agent, or Firm—Kenyon & Kenyon, Reilly, Carr & Chapin

[57] ABSTRACT

Materials of low electrical conductivity, such as minerals and metal compounds, are floated on a metal melt which is itself heated by a channel-type electric inductor, the heat from the melt transferring to the material. A pneumatic blast is injected into the melt so that the interface between it and the material is caused to dynamically undulate, promoting the heat exchange from the melt to the material. The blast can carry particles of additive or reactive agents.

7 Claims, 8 Drawing Figures

ELECTRIC INDUCTION HEATING OF MATERIALS OF LOW ELECTRICAL CONDUCTIVITY

BACKGROUND OF THE INVENTION

It is prior art knowledge that in connection with the manufacture of mineral wool, diabase, quartz, etc., has been melted, superheated and held at the desired temperature, in a tilting channel-type electric induction furnace, the furnace forming a sump in which a steel melt is held and heated by the inductor, the material to be heated floating on the melt and being thereby heated. The materials mentioned are of such low electrical conductivity as to be considered electrical non-conductors and, therefore, being incapable of being heated by electric currents.

The above technique would seem to have attractive possibilities in other fields. Oxides and sulfides of metals, either in the form of ores or products of manufacture, require to be fused and processed to obtain their metallic component, refinement or for other purposes. Minerals in general often require fusion and treatment. However, the previously referred to mineral wool manufacturing practice is known to involve undesirably low heat efficiency. For example, the diabase, quartz, etc., is first fused externally of the furnace, requiring a substantial expenditure of energy, the fused material then being poured into the furnace on top of the melt for heating and holding at the temperatures required for the mineral wool manufacturing. If chemical treatment is desired, such as is indicated in other fields, the reactive materials can only be dropped on top of the fused material floating on the steel melt.

The object of the present invention is to increase the heating efficiency of the described practice to an extent making its application more practical in other fields, and, in addition, to provide for making additions to either the melt or the material floating on the melt.

SUMMARY OF THE INVENTION

To attain that object, the present invention provides for a method and a new furnace for practicing this method, characterized in that at least one pneumatic blast is injected into the melt in the furnace, in a direction and with an energy causing the formation of a dynamic, undulating interface between the melt and the material floating on the melt, this greatly promoting heat exchange between the melt and material.

The furnace comprises a tilting refractory vessel which, when upright, forms a bottom portion defining a sump for the metal melt, and a side wall portion upstanding from this sump and forming thereabove a container for the material to be floated on the melt, the sump having a channel-type electric inductor with its channel opening upwardly into this sump for heating the metal melt in the sump. It is contemplated that the sump metal would usually be ferrous, either iron or steel, but any other suitable metal could be used because metals in general have adequate electrical conductivity to be efficiently heated by induced electric currents.

For the injection of the pneumatic blast, one or more pneumatic blast tuyeres are positioned in the vessel's side wall portion adjacent to the upper level of the sump and pointing substantially horizontally into the container. Therefore, for a furnace start-up, molten metal can be charged in the sump and brought to temperature with the blast tuyere above the sump metal level.

Tilting of the furnace in the tuyere's direction submerges the tuyere in the melt, at which time an inert gas can be passed through the tuyere to hold back the melt and keep the tuyere free from the melt. Also, for startup, the material of low conductivity is fused outside of the furnace, so that the material can be charged to form a fused bath above the melt.

When the vessel is charged with both the melt and the fused material, then the pneumatic blast is introduced through the tuyere which, the vessel now being tilted, points angularly upwardly into the melt. With the volume and pressure of the blast adequately provided, the result is that the interface between the melt and the fused material can be caused to dynamically undulate. At the same time, the melt itself is strongly stirred so that the heat more or less locally imparted by the channel-type inductor positioned so that it remains submerged in the melt, after the vessel is tilted, is distributed widely throughout the melt. With adequate blast energy, the blast can also serve to stir the fused material above the undulating interface. A substantial increase in the heating efficiency is obtained.

Furthermore, the blast can also serve as a carrier for particles of additive or reactive materials. When intended for the fused material floating on the melt, these materials must first pass through the metal melt so as to be thereby preheated before entering the fused material. Using diabase as an example, by the prior art practice, each charge requires external heating. With the present invention, the initial charge is externally heated but thereafter the diabase can be added as particles blown in by the blast, preheated by the melt and added to the diabase floating on the melt. With the tiilting vessel provided with an upper charging opening through which, by further tilting of the vessel, the diabase can be tapped by pouring through the charging opening, the vessel can be tilted from time to time for tapping and with the diabase added as required via the blast to provide for one charging after another, without external heating of each new charge of material.

BRIEF DESCRIPTION OF THE DRAWINGS

The method and the new furnace is schmatically illustrated by the accompanying drawings in which the various figures are as follows.

DETAILED DESCRIPTION OF THE INVENTION

Figure 1:
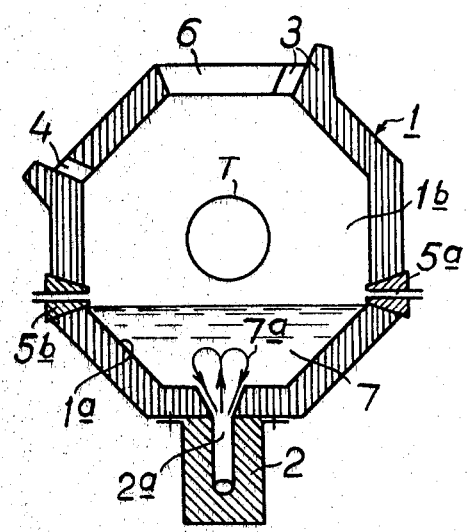
FIG. 1 is a verticl section showing the new furnace transversely with respect to its tilting direction, the furnace being upright and containing the metal melt.

Referring first to FIG. 1, the furnace comprises a tilting refractory vessel 1, the vessel being indicated as being mounted by trunions T journaled in the usual fashion and, although not shown, the vessel having any of the usual tilting mechanisms commonly used for channel-type induction heating furnaces in general.

The vessel is shown as upright and forming a bottom portion defining a metal melt sump 1a and a side wall portion 1b upstanding from the sump and forming thereabove a container for the material to be heated. The sump 1a converges downwardly to a channel-type electric inductor 2 having a channel 2a opening vertically upwardly into the sump. Above the wall portion 1b the vessel converges and forms a tapping spout 3 by which the material heated, can be tapped by tilting of the vessel further to the right, a metal melt tap hole 4 also being provided so that by tilting of the vessel to the left the metal melt can be tapped.

Two pneumatic blast tuyeres 5a and 5b are mounted in the upstanding side wall portion adjacent to the upper level of the sump 1a, the tuyeres being diametrically opposite to each other and both pointing horizontally into the container. The converging top portion of the vessel has a charging opening 6, the spout 3 being formed as part of this charging opening.

As shown, the vessel has an octagonal cross section, the axial extent of the vessel being proportioned in accordance with good channel-type induction furnace design. With this shape, the bottom three sides form the sump in which the molten melt is initially charged, as indicated at 7 in FIG. 1. The vertical walls form the container for the material to be heated.

For start-up, FIG. 1 shows that the metal melt 7 has been charged so as to fill the sump 1a up to the level of the tuyeres 5a and 5b, power being applied to the inductor 2 so that it is heating the melt 7 with the characteristic pinch effect forming the flow currents indicated at 7a in the melt.

Figure 2:
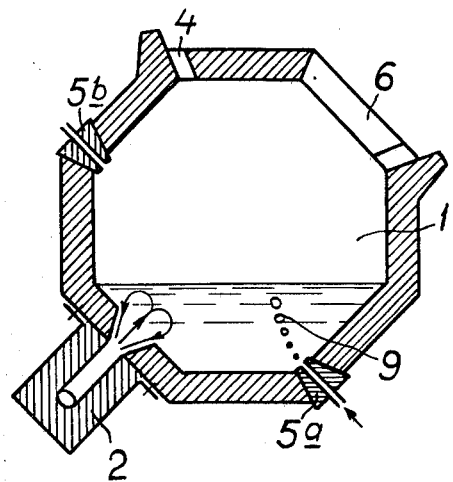
FIG. 2 shows the furnace tilted to the right and ready for charging with the fusible material of low conductivity.

With the metal melt 7 brought to the desired temperature and held there by the inductor, the vessel is next tilted to the right, as shown by FIG. 2, so that the nozzle 5a is submerged in the melt, this placing the charging opening 6 in position for charging.

Figure 3:
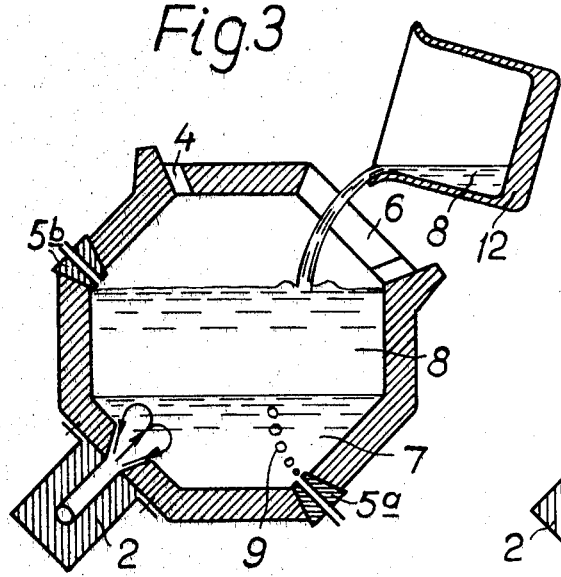
FIG. 3 shows the charging of the furnace, the material having been previously fused.
Figure 4:
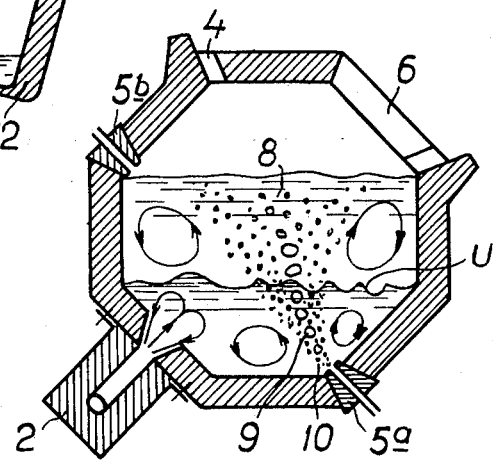
FIG. 4 shows the blast injection and consequent formation of the undulating interface between the melt and the material.

FIG. 3 shows the externally fused material 8 being charged through the opening 6, from a crucible 12. The melt 7 is prevented from running backwardly through the blast tuyere 5a by the injection of an inert gas under just enough pressure for the purpose described. Nitrogen or argon may be used for this purpose. In FIG. 4 the tuyere 5a is being provided with the blast 9 of high energy and volume and, because of the vessel tilting, pointing angularly upwardly into the melt 7, the inductor 2, of course, remaining submerged in the melt.

The dynamically undulating interface is indicated at U in FIG. 4 while the dynamic stirring currents in both the metal melt and the material 8 are indicated by the circular arrows shown. The heat from the inductor 2 under static conditions other than for the pinch effect currents 7a, is largely confined to one area of the melt, under the conditions previously practiced. In the present instance, the melt is pneumatically stirred extensively as is also the fused material 8 floating on the melt. A highly efficient heat exchange is effected between the melt heated by the inductor 2 and the fused material of low conductivity floated on the melt and necessarily heated solely thereby.

In addition, in FIG. 4 the blast is shown as carrying particles 10 which are driven through the melt and into the fused material 8 floating on the melt. These particles may be either additive or chemically reactive in nature. For example, if the fused material 8 is an iron oxide, the particles 10 may be reducing in nature, such as being carbonaceous, in which case iron is added to the melt 7 assuming the latter is ferrous. On the other hand, if the fused material 8 is diabase, for example, the particles 10 may be diabase also, thus continually adding to the volume of the bath 8 floating on the melt 7. In all such cases, the particles added are highly preheated before reaching their destination, because of their passage through the metal melt.

However, under some conditions and depending upon the composition of the fused bath 8, the particles 10 might be reactive with respect to the metal bath 7, although in some cases this may be desired. Assuming it is not desired, then the pneumatic bath may be introduced solely into the fused material 7 by using the blast tuyere 5b, the vessel having tilted slightly to the left so that now the tuyere 5b is submerged in the fused bath 8 under treatment. The tuyere 5a can be rendered substantially inactive at this time, using only the protective gas 9 to block the nozzle against loss of the metal melt through the nozzle.

It can be seen that this new method and furnace may be used for either the reduction or purification, or only for bringing to desired temperature, the fused material 8. The heating may be either for physical or chemical reasons.

Figure 6:
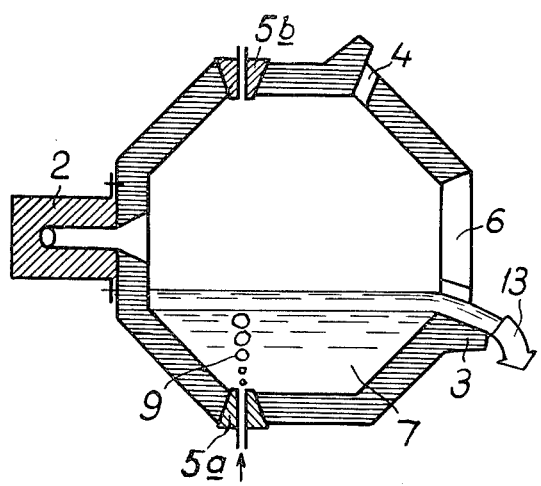
FIG. 6 shows the furnace tilted to the right and horizontal, for tapping of the fused material.

In any event, when the fused material is ready for tapping, the vessel is tilted horizontally to the position shown by FIG. 6 to form the discharge 13 as a poured stream via the lip 3. Although this tilting empties the channel of the inductor 3, the molten metal melt 7 is substantially completely retained in the vessel. The time required to tap the fused material 8 can be short enough so that the melt 7 does not freeze. Due to the octagonal shape of the vessel, what are the three right sides when the furnace is upright as shown in FIG. 1, now forms a sump, the fused material 8 being poured off from the top of the metal melt.

Figure 7:
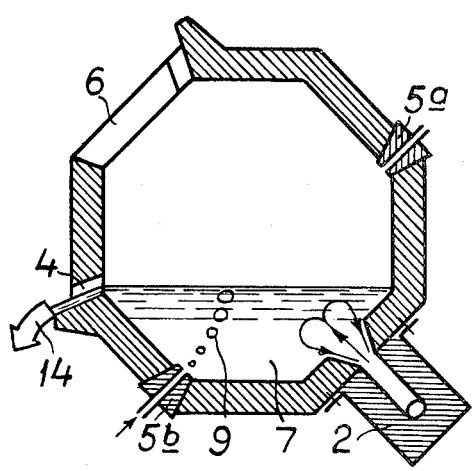
FIG. 7 shows the furnace tilted towards the left and beyond its vertical position, for tapping of the metal melt itself, when this becomes necessary.

In some instances, the charge of fused material, such as in the case of iron ore or iron oxides when the melt 7 is ferrous, may cause the volume of the melt to be increased so, as shown in FIG. 7, by tilting the furnace from the FIG. 6 position back to its upright position as shown by FIG. 1, and then further to the left as shown by FIG. 7, the metal melt 7 can be tapped via the melt tap hole 4 to form a tap stream 14. At this time the tuyere 5b is supplied with a flow of gas adequate to prevent the melt from flowing backwardly through the tuyere, the inductor 2 being returned to operation and again heating the melt 7.

Figure 5:
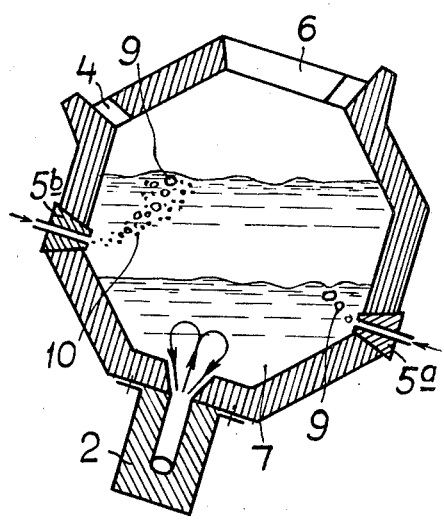
FIG. 5 shows the furnace tilted somewhat towards its upstanding position and permitting the injection of a second blast into the fused material being treated.

The vessel having gone through the various phases or stages described herein, can now be returned to its FIG. 1 position and passed that to the right, to the FIG. 2 position for recharging as shown by FIG. 3. On the other hand, the furnace can be returned to the FIG. 2 position with recharging effected entirely by introducing the new charge as particles, indicated at 10 in FIG. 4, which, preheated by their passage through the melt 7, gradually and progressively form a new fused collection, as indicated by FIG. 4, for treatment through the phase indicated by that figure, and if necessary, as indicated by FIG. 5, so that tapping can again proceed as shown by FIG. 6.

In the foregoing, the various treating operations have not been specifically described in great detail. The prior art is familiar with the problems of fusing minerals in general, as well as metal oxides, sulfides, and other materials of low conductivity and generally considered to be electrically non-conductive, at least to a degree making their electrical inductive heating impractical in the commercial sense. Further, the desirability of making additions to fused materials in general, is well known, these including reactive and purifying additives, and the like. In connection with the melt reduction of metal oxides, such as iron ore concentrates and iron oxides in general, the metal melt in the sump would ordinarily be a highly carbonaceous iron melt, and in this case the fused materal 8 would essentially be a slag, the production of the vessel being largely the reduced iron remaining in the sump, the tapping indicated by FIG. 6 being largely a slag removal operation, whereas the tapping indicated by FIG. 7 would essentially be the recovered iron. To keep the iron melt in the sump highly carbonaceous, the particles 10, shown as being injected in FIG. 4, would be carbonaceous, such as powdered coke, and the operation shown by FIG. 5 might be eliminated unless required as slag additions to control the slag viscosity and possibly its chemistry.

Figure 8:
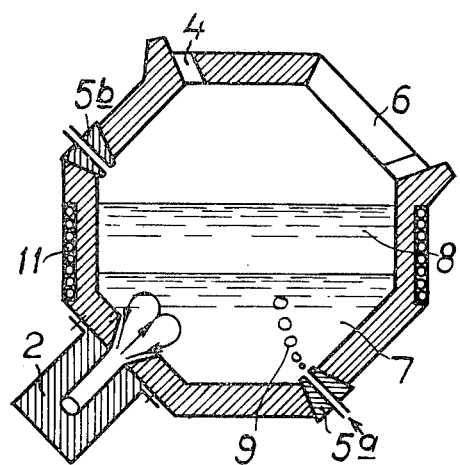
FIG. 8 shows a modification of the furnace.

When the vessel is shown in the position shown by FIG. 4, and with chemical reactions proceeding, it is recognized that the interface represents a zone which is apt to attack the refractory walls which at that time form the sump and the container for the fused material under treatment. However, as shown by FIG. 8, these walls can be protected as by the use of external water cooling, indicated by the water-cooling pipes shown by FIG. 8 at 11.

Because of the general octagonal cross section of the vessel of this new furnace, it can be seen that in FIG. 1 the wall mounting the inductor 2 and the two adjacent converging walls form the sump for the metal melt 7. However, when turned to the position shown by FIG. 2, it is the wall containing the channel 2a and the next two walls to the right of that wall, which form the sump, the two walls on either side of these three walls forming the container of the material 8 being heated. When partially tilted to the right as shown by FIG. 5, a transition occurs wherein all of the walls, excepting the one defining the charging opening 6 and the one to the left of this wall, contain the hot materials. All of these walls are contacted by the hot materials, whether the melt or the fused material under treatment or heating, must, of course, be constructed to withstand the temperatures, and possible chemical reactions to which they are subjected.

Depending on the axial extent of the vessel, a plurality of the inductors may be used, this also applying to the blast tuyeres. In some instances, only one or more of the tuyeres 5a may be needed.

Due to the angular orientations of the two blast tuyeres 5a and 5b relative to the pointing direction of the channel 2a of the inductor 2, either of the tuyeres and the channel are interspaced relative to each other and each points diagonally in the direction of the other in each instance.

The injected particles 10 may be either only additive to increase volume, or reactive, either oxidizing or reducing, with respect to either or both the metal melt in the sump on the fused material of low conductivity and floating on the melt. The volume of either the material on the melt, or both, can increase as desired, because either or both can be tapped from the vessel as required to keep the volume in the vessel, within the capacity of the sump and container portions of the vessel. The pneumatic blast or blasts, whether or not carrying particles of additive or reactive materials, or both, can be injected in either or both the metal melt on the material floating on the melt, but usually the blast would always be injected into the melt to form a disturbed interface and cause the melt to flow relative to the inductor channel, for melt heating uniformity.

What is claimed is:

1. A method for heating fused electrically non-conductive material, comprising forming a metal melt in a furnace, pouring said material on the melt so as to form a bath of the material floating on and completely covering the melt's surface and so that the melt and bath form a coextensive interface, inductively heating the melt so that the melt heats the bath via said interface, and injecting a pneumatic blast into the melt upwardly from the melt's lower portion towards said interface and with the blast having a force and direction causing said interface to undulate to a degree increasing the efficiency with which the melt heats the bath.

2. The method of claim 1 in which at least one channel-type electric inductor having a channel is positioned so that said melt can flow in said channel to effect said heating, and said blast is directed to dynamically stir said melt so as to promote a distribution of the heat of said heating, throughout said melt.

3. The method of claim 2 in which said blast is formed by a gas flow in which solid particles are carried to said material floating on said melt, by passage through and preheating by said melt.

4. The method of claim 3 in which said particles have the same composition as said material floating on said melt.

5. The method of claim 3 in which said particles are chemically reactive with said material floating on said melt.

6. The method of claim 3 in which said material is an oxide compound of said metal from which said melt is formed, and said particles are reducing with respect to said compound and reduce the compound so its metal becomes a part of said melt.

7. The method of claim 3 in which said channel and said blast are interspaced and pointed upwardly angularly towards each other.

* * * * *